United States Patent

[11] 3,580,613

| [72] | Inventor | Walter A. Northrop<br>Hayes Route, Box 9-A, Woodland, Wash. 98674 |
|---|---|---|
| [21] | Appl. No. | 802,882 |
| [22] | Filed | Feb. 27, 1969 |
| [45] | Patented | May 25, 1971 |

[54] BUMPER COMBINING HITCH AND STEP
4 Claims, 4 Drawing Figs.

[52] U.S. Cl. ................................................. 280/500,
105/447, 280/164, 280/166, 280/511, 293/69,
293/73, 296/62

[51] Int. Cl. ............................................... B60d 1/06,
B60r 3/02, B60r 19/00

[50] Field of Search............................................ 105/443,
447, 450; 280/166, 500, 502, 505, 511, 164;
293/48, 63, 64, 65, 69, 73, 74, 62; 296/62

[56] References Cited
UNITED STATES PATENTS

| 1,478,249 | 12/1923 | Pflager .......................... | 293/48 |
| 1,689,147 | 10/1928 | McCloud........................ | 293/73 |
| 2,130,837 | 9/1938 | Brenner.......................... | 105/447 |
| 2,521,356 | 9/1950 | Frederick....................... | 280/500 |
| 2,783,555 | 3/1957 | Wright ........................... | 105/447X |
| 3,394,947 | 7/1968 | Strube Sr....................... | 280/166 |
| 3,408,959 | 11/1968 | Cripe et al. .................... | 105/447 |
| 3,451,710 | 6/1969 | Savell............................. | 293/73 |
| 3,480,296 | 11/1969 | Starling......................... | 293/69 |

*Primary Examiner*—Arthur L. La Point
*Assistant Examiner*—Howard Beltran
*Attorney*—Kolisch & Hartwell

ABSTRACT: A vehicle bumper having a trailer hitch step construction including an elongated bumper assembly which, in operative position, is mounted at the end of a vehicle and in a position extending transversely of the vehicle. A bumper section hinged to the bumper assembly between its ends is swingable from a raised position rearwardly and downwardly to form a step. The bumper section in its raised position seats within a well defined between end portions of the bumper assembly. The bumper section in its raised position is surfaced with a plate which is substantially flush with plates provided in the end portions of the bumper assembly. A trailer hitch component is mounted within a recess provided adjacent the rear margin of the bumper section.

PATENTED MAY 25 1971　　　　　　　　　　　　　　　　3,580,613

INVENTOR
WALTER A. NORTHROP
BY
Kolisch + Hartwell
ATTORNEYS

//3,580,613//

BUMPER COMBINING HITCH AND STEP

This invention relates to vehicle bumpers, and more particularly to a vehicle bumper which includes a bumper section which may be swung down to provide a step.

The construction contemplated is particularly suited for incorporation with a vehicle such as a pickup truck. Such are frequently used in the mounting of so-called "campers," and the step contemplated is an assist in climbing up into the camper. The bumper construction, however, has utility even in the absence of a camper, as it provides additional platform space to stand on when handling articles during the loading and unloading of the pickup.

The construction contemplated has a number of advantageous features. To indicate a few, with the bumper section discussed in its raised position, the same seats in a well provided in the bumper assembly, and a substantially continuous platform area is provided that may be used to stand on or for other purposes. With the bumper section raised, the tailgate of the pickup may be lowered in its conventional manner. A trailer hitch component may be mounted, in a recessed position on the bumper section, for the coupling of a trailer when such is desired. With the bumper section lowered to form a step, the same is swung away from the vehicle and downwardly, with inverting of the bumper section, to expose a surface which now forms the top surface of the bumper section, used as a stepping surface. Lugs depending downwardly from the bumper assembly define the lowered position for the swingable bumper section. Latch means interposed between the bumper section and the bumper assembly is utilized to lock the bumper section in its raised position, whereby the trailer hitch has a rigid mounting permitting the same to apply a drawing force to a trailer.

Various other objects and advantages will become more fully apparent as the following description is read in conjunction with the accompanying drawings, wherein.

Figure 1:
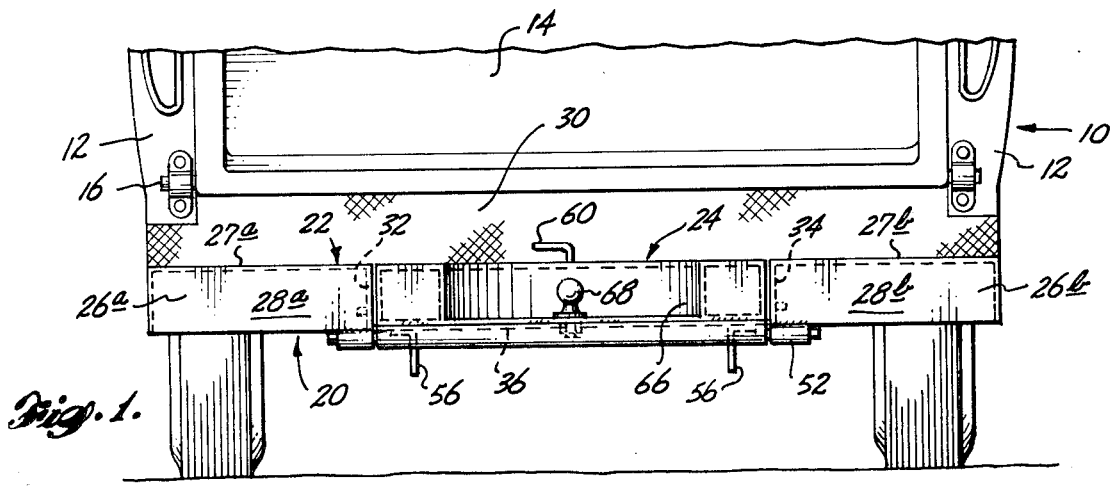
FIG. 1 is a view of rear portions of a pickup truck, and showing a bumper construction as contemplated mounted on the truck.

Referring now to the drawings, illustrated generally at 10 are rear portions of a vehicle, such as a pickup truck. Side fenders in the truck are shown at 12. Hingedly mounted between the side fenders, and lowerable to provide access to the back of the pickup, is a tailgate 14. The tailgate swings about a hinge axis indicated generally at 16.

The bumper construction of the invention is illustrated generally at 20. In general terms, such includes an elongated bumper assembly 22, and intermediate the ends of the bumper assembly, and shown in a raised position in FIGS. 1, 2 and 3, a movable bumper section 24.

The bumper assembly may comprise a pair of end platform portions 26a, 26b, including top plates 27a, 27b, and depending from these plates, skirt portions shown at 28a, 28b. Along the forward margin of the assembly there may also be provided an upstanding flange 30. Joined to this flange, and to walls 32, 34 of the end platform portions, is a central expanse or plate 36. All of the structure described may be made of metal, such as steel, and suitably welded together, to form an integral unit. The assembly may be mounted on the vehicle, as through brackets such as the one shown at 38 joining the assembly to frame members such as the one shown at 40 in the vehicle.

Figure 2:
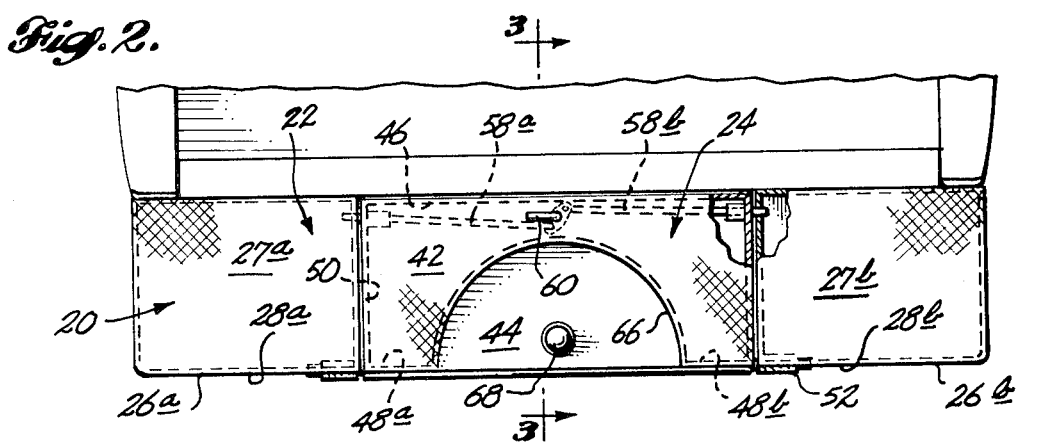
FIG. 2 is a top plan view of the bumper construction shown in FIG. 1.
Figure 3:
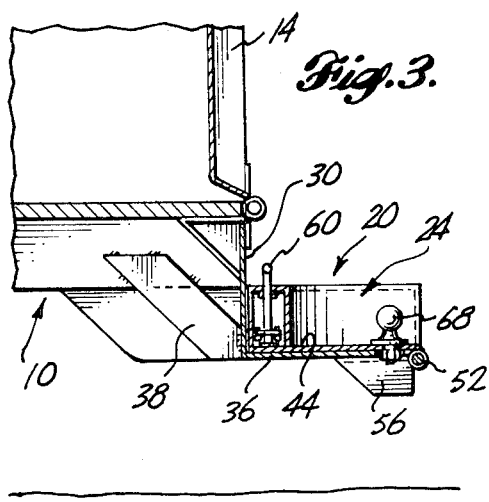
FIG. 3 is a cross-sectional view, taken along the line 3-3 in FIG. 2, and showing a bumper section in the construction in its raised position.
Figure 4:
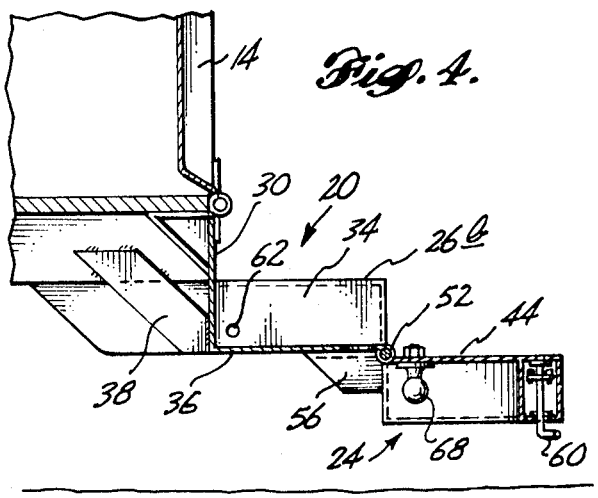
FIG. 4 is a view, similar to FIG. 3, and showing the bumper section swung outwardly and in a lowered position forming a step.

Bumper section 24 is a boxlike member of substantially rectangular outline. The top of the bumper section, with the section in its raised position, as shown in FIGS. 1, 2 and 3, includes plate portion 42 which forms a continuation of, and is substantially flush with, plate portions 27a, 27b of the bumper assembly. The base of the section is formed by a baseplate 44. The side and end walls in the bumper section are shown at 46, 48a, 48b, and 50.

The bumper section is hinged to bumper assembly 22 through elongated hinge 52 which hinges the lower rear margin of the section, with it in its raised position, to the lower rear edge of the bumper assembly. This hinge provides a horizontal pivot axis extending transversely of the vehicle shown. By reason of this hinge mounting, when the bumper section is moved from its raised position, it swings downwardly and rearwardly while inverting, to place it at a somewhat lower elevation, with baseplate 44 now on top and at substantially the level of central expanse 36.

The lowered position for the bumper section is defined by depending lugs 56 which are joined to, and depend downwardly from, the bottom of the bumper assembly. By having them joined to the bumper assembly and fixed beneath it, they are out of the way and substantially obscured from view.

The bumper section is latched in its raised position through a latch system including rods 58a, 58b, which by a toggle link mechanism are extended through turning of turn handle 60. When extended, these fit into cylindrical seats, such as the one shown at 62, provided in platform portions 26a, 26b on either side of expanse 36.

Adjacent the rear margin of the bumper section, with the section raised, is a recess defined by an arcuate wall 66 that extends between walls 48a, 48b and has its lower margin joined to baseplate 44. Mounted within this recess is a ball or hitch component 68 of a conventional trailer hitch. Because of the recessed mounting of this component, the same does not project above the plane of plates 42 or plate portions 27a, 27b.

Another feature of the recessed mounting for component 68 is that it places the point at which the towing force is exerted on the towed vehicle at a relatively low elevation, which minimizes the turning torque applied to the bumper section when towing a vehicle. This reduces the stress applied against the rods 58a, 58b of the latch system.

The operation of the apparatus described should be obvious. Normally the bumper section occupies its raised position, where the section is aligned with the bumper assembly, in a direction extending between the sides of the truck. In this position, the top of the bumper section and the platform portions 26a, 26b are substantially flush. This permits the entire platform area provided on the top of the construction to be used, either for standing or for the deposit of a load. The space behind the tailgate is unobstructed, which permits free movement when lowering tailgate 14.

To provide a step, either for access into a camper mounted on the truck, or to facilitate loading the rear of the truck, the bumper section is swung to its lowered position by unlatching it and swinging it rearwardly and downwardly about the pivot axis provided by hinge 52. With the section lowered, it becomes positioned to one side of the bumper assembly, and a step is provided which a person can stand on in climbing onto the rear of the vehicle. By inverting the bumper section, the recessed region assumes a downwardly facing position, and the baseplate, which extends over the entire bumper section, shifts to a position providing a wide expanse for a person to step onto.

The bumper construction can be used in the hauling of a trailer through the hitch component described. It will further be noted that the construction produces an uncluttered appearance at the rear of the vehicle.

While a specific embodiment of the invention has been described, it should be obvious that variations and modifications are possible without departing therefrom.

I claim:

1. A vehicle bumper including step construction comprising an elongated bumper assembly adapted to be mounted at the end of and in a position extending transversely of a vehicle, said assembly comprising end platform portions joined by a central horizontal expanse forming a unit of the assembly, the central expanse being below the elevation of the tops of the platform portions, and the platform portions and central expanse defining a well intermediate the ends of the bumper assembly, a bumper section between the ends of the bumper assembly resting in said well in a position overlying said central expanse, hinge means forming a connection hinging the lower rear margin of the bumper section to the bumper assembly accommodating swinging of the bumper section to the rear of the bumper assembly and into an inverted substantially horizontal position located toward the rear of the bumper assembly whereby the section may function as a step, said bumper section on being so swung exposing said central expanse whereby such provides an additional support surface to be used in conjunction with said step, and lug means on the bumper assembly positioned to engage the bumper section to define the horizontal position for the bumper section.

2. The bumper of claim 1, which further includes latch means for latching the bumper section to the bumper assembly with the bumper section resting in said well.

3. The bumper of claim 2, wherein a trailer hitch component is mounted on the top of the bumper section with the bumper section resting in said well.

4. The bumper of claim 3, wherein the bumper section has a downward extending recess defined therein with the bumper section resting in said well, and said trailer hitch component is mounted within said recess.